Dec. 2, 1941.   W. ZITELLA   2,264,653
SPRING WHEEL
Filed April 13, 1940   2 Sheets-Sheet 1

William Zitella
INVENTOR.

BY *[signature]*
ATTORNEYS.

Dec. 2, 1941.  W. ZITELLA  2,264,653
SPRING WHEEL
Filed April 13, 1940  2 Sheets-Sheet 2

William Zitella
INVENTOR.
BY
ATTORNEYS.

Patented Dec. 2, 1941

2,264,653

UNITED STATES PATENT OFFICE 2,264,653

SPRING WHEEL

William Zitella, Clarksburg, W. Va.

Application April 13, 1940, Serial No. 329,521

1 Claim. (Cl. 152—264)

This invention relates to spring wheel construction, the primary object of the invention being to provide a spring wheel which will have resilient qualities equal to the usual pneumatic tires now in general use.

An important object of the invention is to provide a spring wheel having a plurality of spring units removably held between the sections of the wheel, the construction of the units being such that they may be readily and easily removed and replaced by persons unfamiliar with mechanics, should the spring units become damaged or otherwise rendered inoperative.

Another object of the invention is to provide a spring wheel which may be readily repaired on the road, eliminating the necessity of removing the truck equipped with the wheels, to a repair shop in order to make the necessary repairs.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings.

Figure 1:
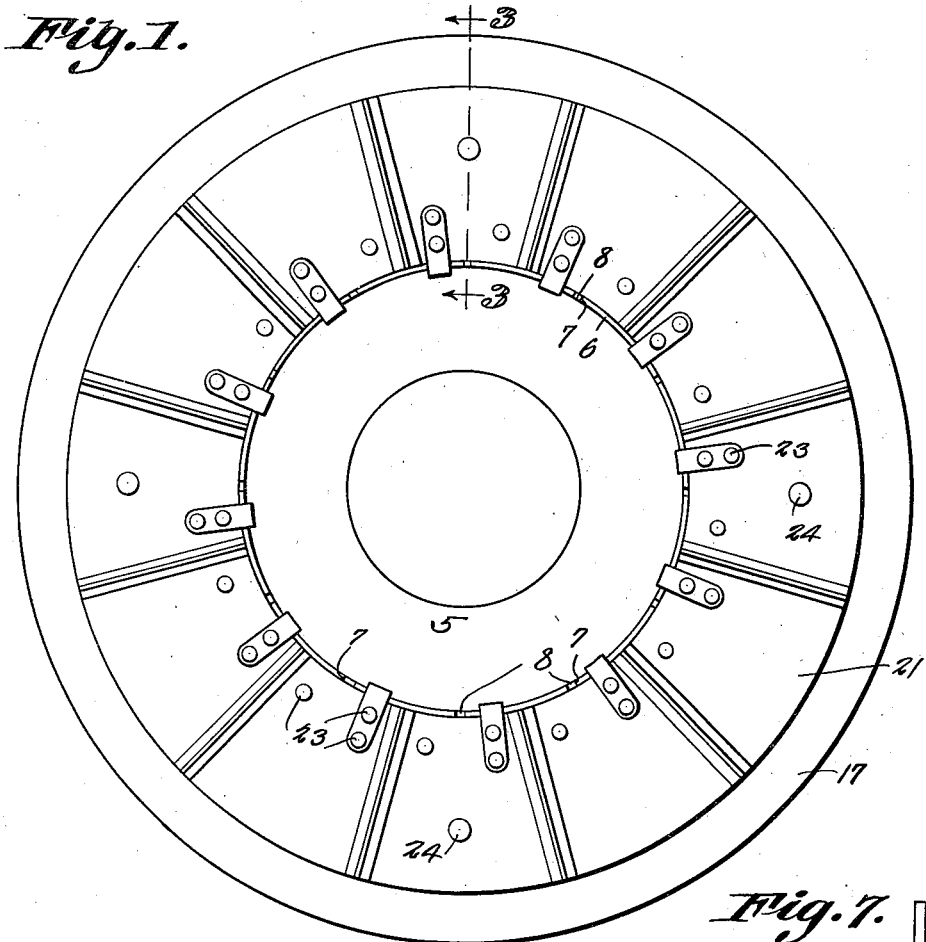
Figure 1 is a side elevational view of a wheel constructed in accordance with the invention.
Figures 6, 7:
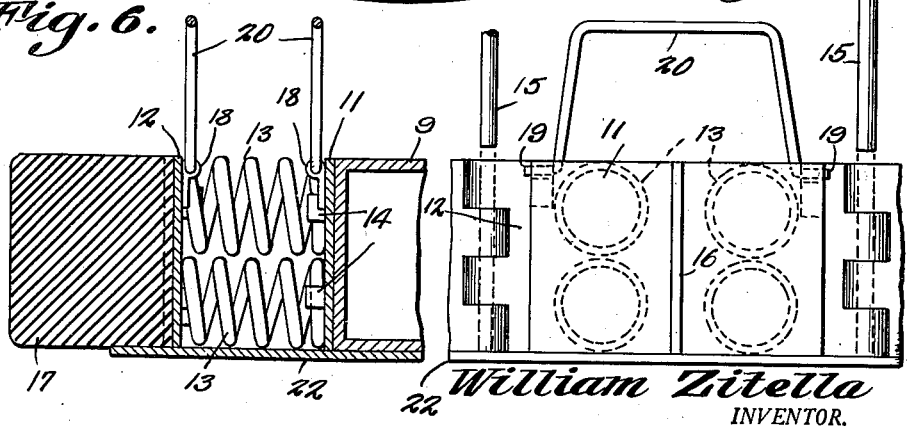
Figure 6 is a sectional view through the wheel, illustrating the removable members employed in removing the spring units.
Figure 7 is a plan view illustrating the spring unit removing members.

Referring to the drawings in detail, the main portion of the wheel is indicated generally by the reference character 5, and as shown is in the form of a pressed steel section. The main portion includes a flange 6 formed with slots 7 extending inwardly from one edge thereof, the slots accommodating the ribs 8 extending from the annular felloe section 9. Due to this construction, it will be seen that rotary movement of the annular felloe section 9 with respect to the main portion 5 of the wheel, will be prevented.

Figure 2:
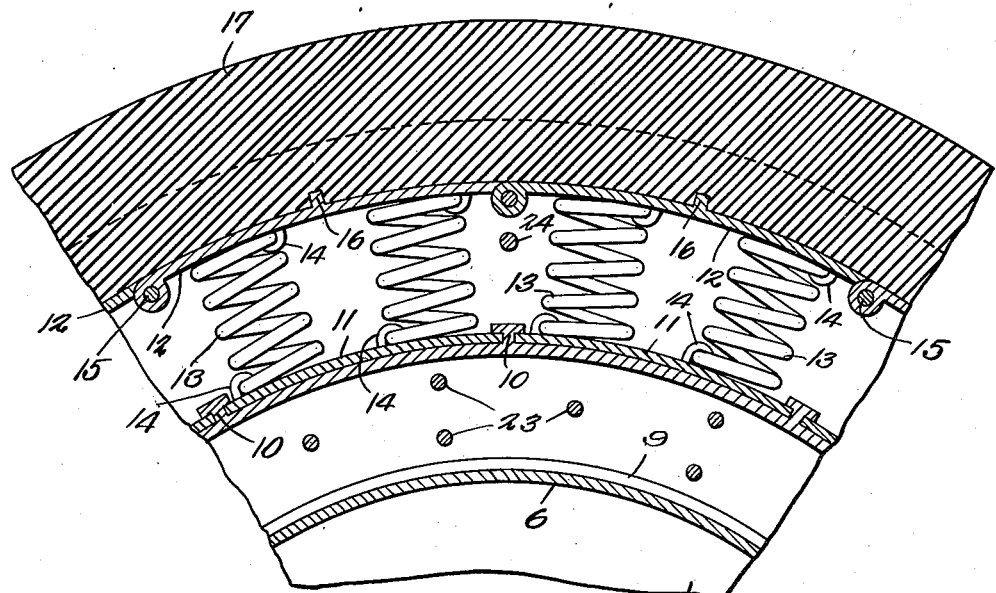
Figure 2 is a fragmental sectional view through the wheel.
Figures 3, 4, 5:
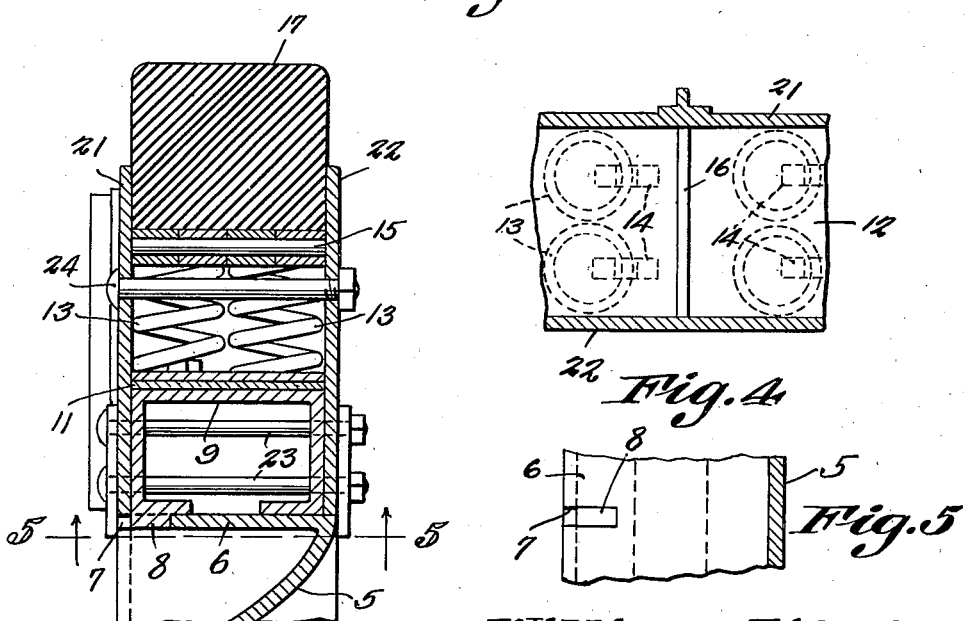
Figure 3 is a sectional view taken on line 3—3 of Figure 1.
Figure 4 is a horizontal sectional view through the wheel, illustrating the spring units in plan.
Figure 5 is a sectional view taken on line 5—5 of Figure 3.

Formed integral on the outer surface of the felloe section 9, are transverse ribs 10 which are formed with grooves disposed in opposite sides thereof and extended longitudinally of the ribs, the grooves being of widths to receive the edges of the lower plates 11 of the spring units. Each of the spring units includes an outer plate 12, the plates 11 and 12 being held in spaced relation with respect to each other by means of the coiled springs 13 which are secured to the plates 11 and 12, by means of the fingers 14 that are stamped from the plates, and bent over the end coils of the springs, as clearly shown by Figure 2 of the drawings.

The adjacent ends of the outer plates interlock, providing a hinge, the hinge including tubular portions for the reception of the pivot pins 15, so that the outer plates of the spring unit may pivot with respect to each other.

Transverse ribs 16 are formed on the outer plates 12 of the spring units, and fit into grooves formed on the cushion tire 17, which is mounted on the outer plates of the spring units. These ribs 16 prevent rotary movement of the cushion tire 17 with respect to the spring units.

Lugs indicated at 18 are formed on the inner and outer plates of the spring units, the lugs being formed with openings for the reception of the right angled ends 19 of the spring unit removing members 20. Each of these spring unit removing members embodies a length of resilient heavy wire material bent intermediate its ends to provide leg members, the right angled free ends of the leg members being fitted in the openings of the lugs. It will be seen that when these spring unit removing members have been properly positioned, that by merely pulling the spring unit removing members, the spring units will be released from the grooves in the ribs 10. It will of course, be understood that these members may also be used to replacing the spring units.

Outer and inner plates 21 and 22 are bolted to the annular felloe member 9, by means of the bolts 23, there being also provided bolts 24 extended through openings in the outer and inner plates 21 and 22 at points between springs of certain of the spring units, holding the plates 21 and 22 against spreading.

From the foregoing it will be seen that due to the construction shown and described, the wheel will be exceptionally flexible, and that by removing the outer plate 21, any one of the spring units may be readily removed and replaced, should the same become damaged or otherwise rendered inoperative.

What is claimed is:

In a spring wheel, a main wheel section having a felloe, transversely disposed ribs formed on the surface of the felloe, said ribs having grooves formed in the outer surfaces thereof, removable independent spring sections, each section embodying an inner curved plate and an outer curved plate, pairs of coiled spring secured between the curved plates of each section and adapted to normally hold the plates in spaced relation with respect to each other, the longitudinal edges of the inner curved plates adapted to be held within the grooves of said ribs securing the spring sections to the felloe, interlocking tubular portions formed at the ends of the outer plates of the spring sections, pivot pins extending through the interlocking tubular portions, hingedly connecting the outer plates of the sections, a tire mounted on the spring sections, and plates bolted to the felloe on opposite sides thereof, said plates extending beyond the spring sections and extending an appreciable distance over the tire mounted on the spring sections slidably mounting the outer curved plates.

WILLIAM ZITELLA.